Oct. 11, 1966    R. G. ECKARD    3,277,704
HIGH RANGE LOAD SENSING DEVICE
Filed Jan. 2, 1964
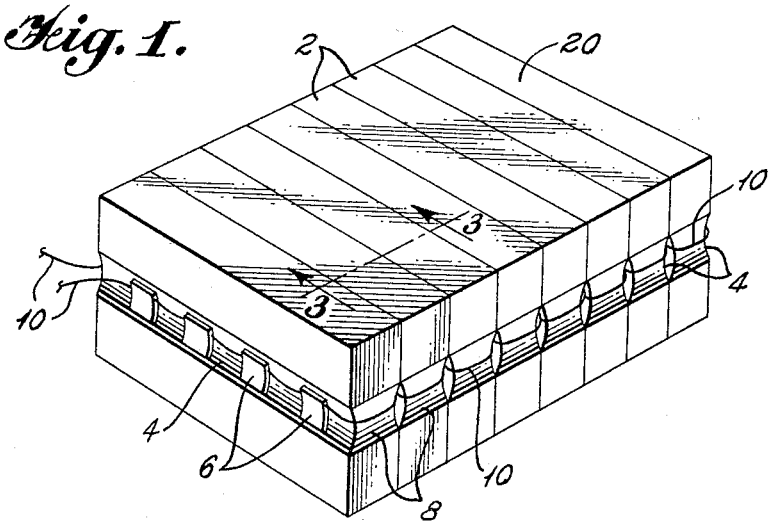
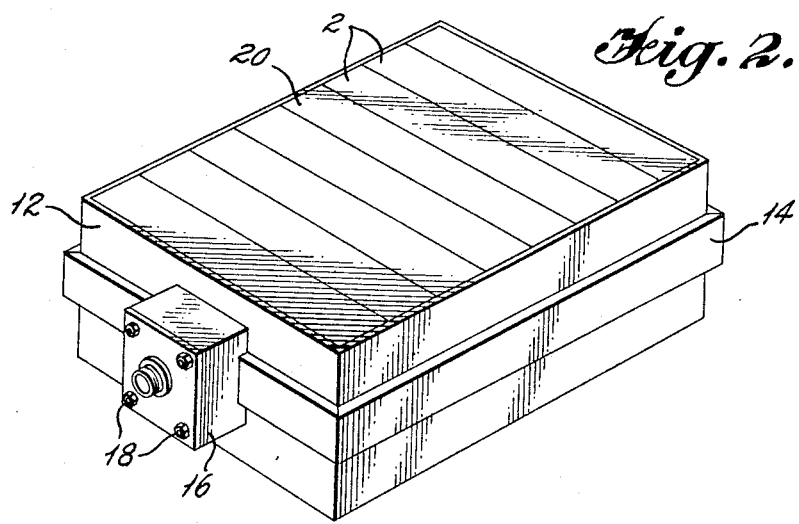
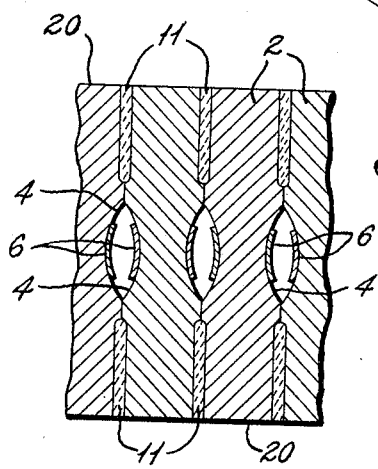

Oct. 11, 1966 R. G. ECKARD 3,277,704
HIGH RANGE LOAD SENSING DEVICE
Filed Jan. 2, 1964 3 Sheets-Sheet 3

United States Patent Office 3,277,704
Patented Oct. 11, 1966

3,277,704
HIGH RANGE LOAD SENSING DEVICE
Ronald G. Eckard, Cumberland, Md., assignors to Allegany Instrument Company, a Division of Textron Electronics, Inc., Cumberland, Md., a corporation of Delaware
Filed Jan. 2, 1964, Ser. No. 335,134
7 Claims. (Cl. 73—141)

This invention relates to a high range load sensing device, or force measuring device.

It is known in the prior art that strain gages have been applied to columns, rings and other shapes of structures to measure strain. It is usual to apply the strain gage directly to the structure or to a supporting or auxiliary structure to measure the strain when a force or load is applied to the structure. The load is measured by measuring the change in voltage or current due to the change of resistance of the strain gage as the structure is distorted by the load.

It is an object of this invention to provide a very high capacity of load measuring device, for example, to measure loads in the order of 2.5 to 3.5 million pounds.

It is a further object of this invention to provide a load measuring device which is sensitive across the entire cross-section of the device.

It is a futrher object of this invention to produce a load measuring device which can be readily handled and used without damaging the fragile parts.

It is a further object of this invention to provide a method for making a load measuring device whereby the strain gages will not be damaged during the course of manufacture.

With these and other objects in view, the invention consists of the construction, arrangement, and combination of the various parts of the device whereby the objects contemplated are obtained, as hereinafter more fully set forth and illustrated in the accompanying drawing, wherein:

FIG. 1 shows the separate plates and strain gages in assembled relationship.

FIG. 2 shows the device of FIG. 1 in a protective housing.

FIG. 3 is a fragmentary section taken along the line 3—3 of FIG. 1.

Figure 4:
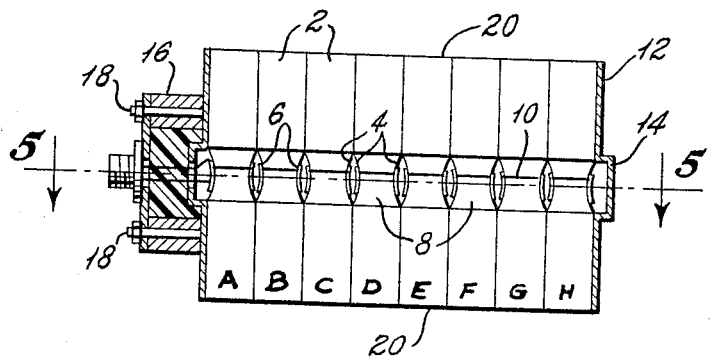
FIG. 4 is a vertical view partly in section showing the position of the strain gages.

The load measuring device comprises a plurality of support members in the form of plates 2. Each plate has a recess 4 in each of its opposite faces and a plurality of strain gages 6 are secured in each recess and all the gages are connected in series. The end face of each plate is also provided with a recess 8. When the plates are assembled the recesses 8 are aligned to provide a channel for the wires 10 connecting the strain gages. All the plates are welded together as at 11 along their contacting faces by electron beam welding which produces a good weld without damaging the strain gages. The faces 20 of the laminated device are ground and lapped flat after welding.

Any suitable strain gage can be used in practicing the invention which can be secured to the structure to measure local strain.

A sheet metal protective housing 12 formed with a channel portion 14 is secured to the device as by welding to the edge faces. The channel portion provides flexibility to the housing in the vertical direction, that is, it adds no rigidity to the structure. It also affords a conduit for the wires 10.

A junction box 16 is fitted on the cover and is secured to the device by any means, for example, studs 18. The wires 10 are secured to a conventional connector in the box which is then filled with any suitable potting compound such as RTV-11 to fixedly retain the wires and connectors in the box.

The strain gages may be connected in series or in groups or in any manner to integrate the load or portions thereof, and the gages in turn will be connected to a suitable measuring circuit to give an indication of the load on a meter or by some equivalent electric signal.

The illustrated embodiment of the invention shows 8 plates and 64 strain gages but more or less may be used depending upon the requirements of the load. The integrating effect of the strain gages in series and their distribution over a large area increases the sensitivity across the entire load bearing area.

Figure 5:
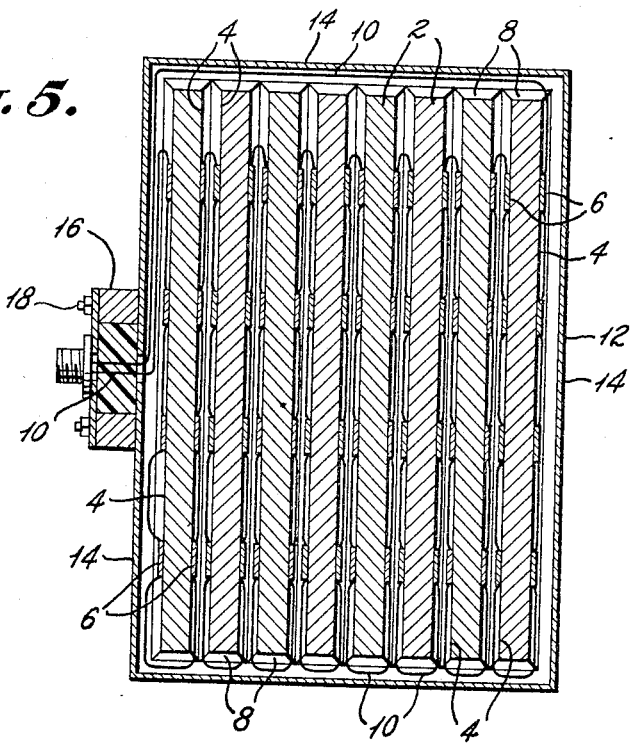
FIG. 5 is a horizontal section taken along the line 5—5 of FIG. 4.
Figure 6:
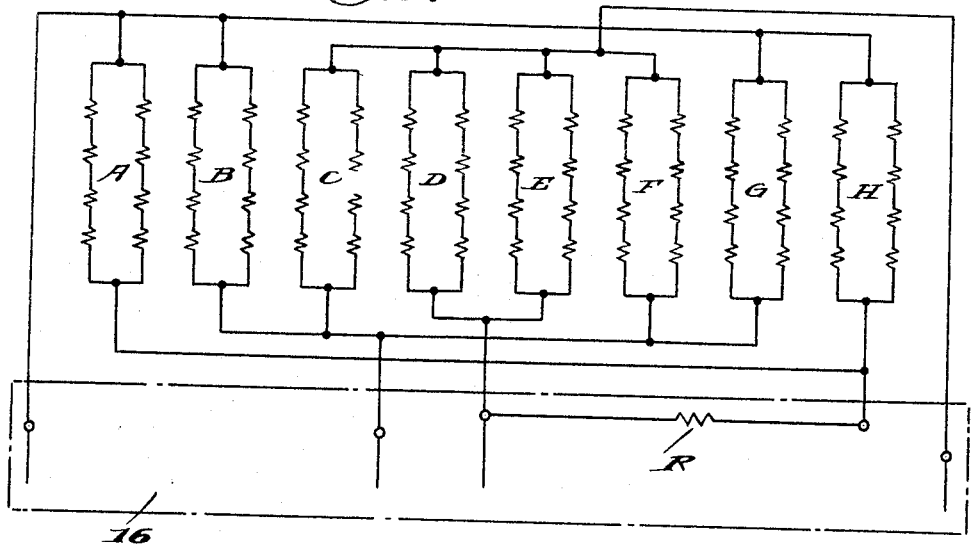
FIG. 6 is a diagrammatic sketch of the connection of the strain gages in the recesses of the block.
Figure 7:
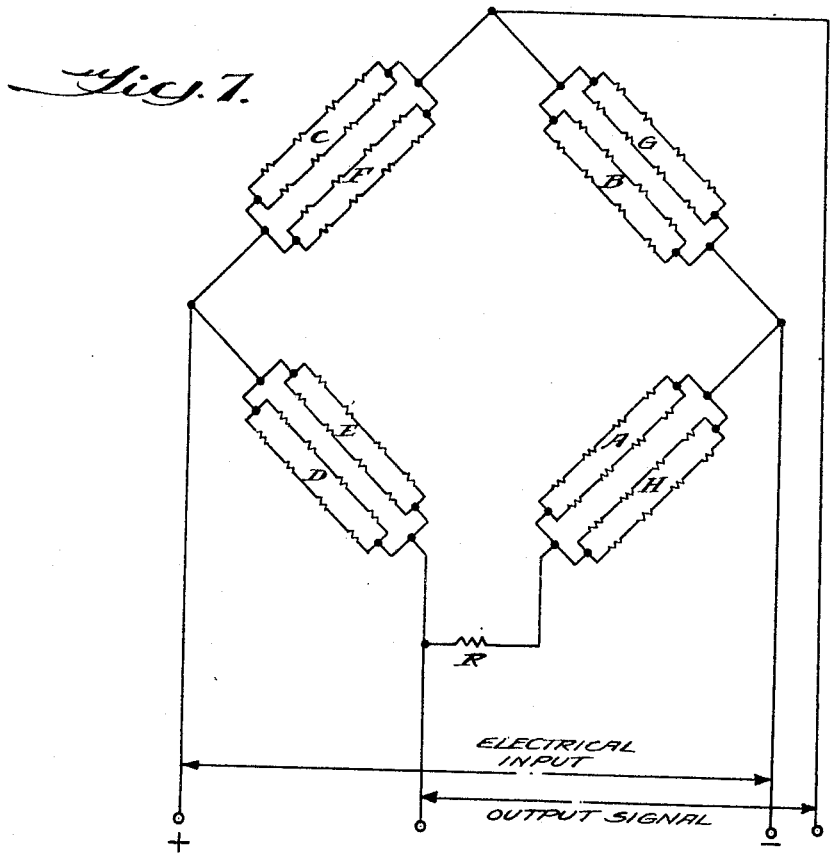
FIG. 7 is a Wheatstone bridge diagram of the arrangement of gages.

FIGS. 6 and 7 show one way in which the 64 gages may be connected. Groups of gages 6 are connected in a series-parallel arrangement, shown as group A which comprise the gages on plate A of the structure shown in FIGS. 4 and 5. Similar series-parallel connection will be made for the gage groups on plates B, C, D, E, F, G, and H.

All of the strain gages on plates B, D, E, and G will be arranged to measure strain parallel to the axis of loading, and all of the starin gages on plates A, C, F, and H will be arranged to measure strain perpendicular to the axis of loading.

The groups A–H are connected in a Wheatstone bridge arrangement as shown in FIG. 7. The bridge terminals are connected in junction box 16 in which is located a balance resistor R. The electrical signal input and output are as shown in FIG. 7.

A load sensing device having a capacity of 2.5 million pounds made in accordance with this invention can be made with a 5″ x 7″ cross-sectioned and is about 2.5″ in height. A 3 mililon pound capacity will have dimensions of about 10″ x 10″ x 4″. Since it is unlikely that the load would be uniformly distributed across the load bearing surface, the laminated construction and the distribution of the strain gages provides a device that is sensitive across its entire cross-section.

It is understood that certain changes, alterations, modifications and substitutions may be made to the structure of the invention disclosed that will fall within the spirit and scope of the appended claims.

What is claimed is:

1. A load sensing device comprising a pluarlity of plates secured together in face to face abutting relationship, each said plate having grooved recesses in opposite faces extending transversely of the load, and a plurality of strain gages secured to each plate in each recess, said strain gages being electrically interconnected in a measuring circuit.

2. A load sensing device comprising a plurality of plates in face to face abutting relationship welded together at their outer edges, each said plate having grooved recesses in opposite faces extending transversely of the load, and a plurality of strain gages secured to each plate in each recess, said strain gages being electrically connected in a series-parallel circuit.

3. A load sensing device comprising a plurality of plates in face to face abutting relationship, each said plate having grooved recesses in opposite faces extending transversely of the load, a plurality of strain gages secured to each said plate in each recess, said strain gages being electrically interconnected in a measuring circuit, and a cover member enclosing all said plates, said cover member being formed with channel portions to provide a conduit for the wires connecting said gages.

4. A load sensing device comprising a plurality of plates in face to face abutting relationship, each said plate having grooved recesses in opposite faces extending transversely of the load, a plurality of strain gages secured to each said plate in each said recess, said strain gages being connected in an electrical measuring circuit in a series-parallel circuit, a cover enclosing said plates and fixed thereto and having channel portions formed therein to provide a conduit for wires to interconnect said gages, a juction box secured to said cover, a balance resistance secured to at least one of the terminals of the wires in said junction box, and a potting compound filling said junction box fixedly securing the wires and connectors therein.

5. A method of making a load sensing device consisting of a plurality of plates in side by side abutting relation comprising, forming elongated recesses in opposed faces of the plates, securing a plurality of strain gages in each recess, connecting the gages in a series-parallel mode, assembling the plates in face to face relationship, electron beam welding the contacting faces, and grinding and lapping the surfaces of the device.

6. A load sensing device comprising a plurality of plates welded together in face to face abutting relationship, each plate having grooved recesses in opposite faces extending transversely of the load, a plurality of strain gages secured to each plate in each recess, said strain gages being electrically connected in a measuring circuit, and a cover member enclosing all said plates, said cover member being formed with channel portions to provide a conduit for the wires connecting said gages, said cover member being mounted to deflect with the load without increasing the rigidity of the device.

7. A method of making a load sensing device consisting of a plurality of plates in side by side abutting relation comprising, forming elongated recesses in opposed faces of the plates, securing a plurality of strain gages in each recess, interconnecting the gages for connection in a measuring circuit, assembling the plates in face to face relationship, electron beam welding the contacting faces, and grinding and lapping the surfaces of the device.

References Cited by the Examiner

UNITED STATES PATENTS

| | | | |
|---|---|---|---|
| 2,814,946 | 12/1957 | Harris | 73—141 |
| 2,855,489 | 10/1958 | Ruge | 73—88.5 X |
| 3,034,347 | 5/1962 | Starr | 73—141 |
| 3,178,938 | 4/1965 | Ruge | 73—141 |

FOREIGN PATENTS 142,460  3/1961  Russia.

OTHER REFERENCES

Unger: Germany printed application No. L 20,726, published August 1956.

RICHARD C. QUEISSER, *Primary Examiner.*

C. A. RUEHL, *Assistant Examiner.*